(12) United States Patent
Taylor et al.

(10) Patent No.: US 8,797,214 B2
(45) Date of Patent: Aug. 5, 2014

(54) TRACKING IMPLEMENTING GEOPOSITIONING AND LOCAL MODES

(75) Inventors: Kirk S. Taylor, San Diego, CA (US);
Jack Steenstra, San Diego, CA (US);
Liren Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1202 days.

(21) Appl. No.: 11/774,535

(22) Filed: Jul. 6, 2007

(65) Prior Publication Data

US 2009/0009398 A1 Jan. 8, 2009

(51) Int. Cl.
*G01S 3/02* (2006.01)
*G01S 19/49* (2010.01)

(52) U.S. Cl.
USPC ...................... 342/451; 342/357.32

(58) Field of Classification Search
USPC ........................ 342/357.01, 357.14, 443, 457, 342/463–465, 451, 357.25, 357.32; 455/456.1, 456.2
See application file for complete search history.

(56) References Cited

U.S. PATENT DOCUMENTS

| | | | |
|---|---|---|---|
| 5,554,993 | A | 9/1996 | Brickell |
| 5,936,572 | A | 8/1999 | Loomis et al. |
| 6,801,129 | B2 | 10/2004 | Grimm |
| 6,907,238 | B2 | 6/2005 | Leung |
| 6,928,292 | B2 | 8/2005 | Tsunehara et al. |
| 7,015,817 | B2 | 3/2006 | Copley et al. |
| 2003/0063000 | A1 * | 4/2003 | Grimm ...................... 340/568.7 |
| 2005/0192741 | A1 | 9/2005 | Nichols et al. |
| 2006/0170591 | A1 | 8/2006 | Houri |
| 2007/0005243 | A1 | 1/2007 | Horvitz et al. |
| 2007/0024450 | A1 | 2/2007 | Shichiku et al. |
| 2009/0009397 | A1 | 1/2009 | Taylor et al. |

FOREIGN PATENT DOCUMENTS

| | | |
|---|---|---|
| CN | 1403832 A | 3/2003 |
| CN | 1755391 A | 4/2006 |
| DE | 10346596 | 5/2005 |
| EP | 1443341 A1 | 8/2004 |
| JP | H1183529 A | 3/1999 |
| JP | 2002296340 A | 10/2002 |
| JP | 2003065780 A | 3/2003 |
| JP | 2005086579 A | 3/2005 |

(Continued)

OTHER PUBLICATIONS

International Search Report, PCT/US08/066446, International Search Authority, European Patent Office, Oct. 20, 2008.

(Continued)

*Primary Examiner* — Dao Phan
(74) *Attorney, Agent, or Firm* — Thien T. Nguyen

(57) ABSTRACT

A wireless device provides location data concerning an object by use of geolocation in order to provide distance tracking and local location techniques in order to provide local tracking. The geolocation and local location techniques may be implemented at the same time or individually, reconfigurable on demand, in both the tracking and tracked devices. The tracked wireless device includes a wireless communication circuit capable of communication with a multiuser wireless subscriber network. A geolocation reading circuit provides GPS or similar location data and is capable of obtaining geolocation data concerning the object. A local locating device parses local location data, and an indication is provided of geolocation based on the geolocation data, and is further responsive to the local location data which is used to modify the geolocation data with the local location data.

37 Claims, 8 Drawing Sheets

(56) References Cited

FOREIGN PATENT DOCUMENTS

| | | | |
|---|---|---|---|
| JP | 2005216128 | A | 8/2005 |
| JP | 2006524316 | A | 10/2006 |
| JP | 2006350869 | A | 12/2006 |
| WO | 9801769 | | 1/1998 |
| WO | WO0068907 | | 11/2000 |
| WO | WO02086533 | A2 | 10/2002 |

OTHER PUBLICATIONS

Written Opinion, PCT/US08/066446, International Search Authority, European Patent Office, Oct. 20, 2008.
European Search Report—EP10158015, Search Authority—The Hagu Patent Office, Aug. 27, 2010.
Partial European Search Report—EP10158015—Search Authority—Hague—Aug. 27, 2010.

* cited by examiner

TRACKING IMPLEMENTING GEOPOSITIONING AND LOCAL MODES

RELATED APPLICATIONS

The present patent application is copending with an application titled "Location Obtained by Combining Last Known Reliable Position with Position Changes", and commonly assigned to the assignee hereof and filed by the inventors hereof.

BACKGROUND

I. Field

The present invention relates generally to geolocation and location services for wireless devices. More particularly the invention relates to modifying geolocation data with local location data.

II. Background

This invention relates to locating and tracking mobile devices, such as wireless communication devices (WCDs).

The term WCD as used herein includes, but is not limited to, a user equipment, mobile station, fixed or mobile subscriber unit, pager, or any other type of device capable of operating in a wireless environment. WCDs include personal communication devices, such as phones, pagers, video phones, and Internet ready phones that have network connections. In addition, WCDs include portable personal computing devices, such as PDAs and notebook computers with wireless modems that have similar network capabilities. WCDs that are portable or can otherwise change location are referred to as mobile units. Wireless communication systems are widely deployed to provide various types of communication such as voice and data. A typical wireless data system, or network, provides multiple users access to one or more shared resources. A system may use a variety of multiple access techniques such as frequency division multiplexing (FDM), time division multiplexing (TDM), code division multiplexing (CDM), and others. Examples of wireless networks include cellular-based data systems. The following are several such examples: (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in "TR-45.5 Physical Layer Standard for cdma2000 Spread Spectrum Systems" (the IS-2000 standard), and (4) the high data rate (HDR) system that conforms to the TIA/EIA/IS-856 standard (the IS-856 standard).

One particular type of WCD is a personal location device. A personal location device is used for purposes of providing location information to the user of the device, in the manner of a GPS or for enabling external tracking of the device, for example by use of a wireless network. It is often desired to provide such personal location devices with low power consumption, using techniques such as Low Duty Cycle (LDC) technology—a technology which enables a device to go into a deep-sleep mode (less frequently transmit or receive on the cellular network) in order to conserve battery life. One disadvantage of LDC is that by reducing the active time of a device, tracking and other location monitoring becomes difficult. It is often the case that if an object is to be tracked, there are times during which a very active duty cycle is advantageous.

For the purposes of this invention, "GPS" is intended to describe GPS, as well as other wide area radio geolocation systems, such as GLONASS, Omega, Loran, etc.

Various cellular location services are used to provide geolocation data concerning a cellphone or other wireless communication device (WCD). Most commonly, this is part of an emergency services function, but can also be used for personal tracking and location oriented services such as map directions. The location services may use location services, such as those provided by the wireless communication network, or by a geolocation device such as GPS. "Location" and "location services" are used to describe the determination of a physical location of a WCD. Typically "location" consists of identifying a position of the WCD which can be translated to geographical coordinates.

A geolocation system uses a system of signals to determine geolocation. This is commonly associated with GPS, although ground-based systems are also used. In addition, wireless communication networks often have a capability of providing geolocation based on the communication links. Such location determinations are considered to be reliable terrestrial navigation or geolocation because if the signals are properly received, the determination is reliable to the accuracy of the system. They are reliable in the sense that location is determined based on the operation of a properly based system in which the geonavigation signals are properly received. It is understood that the GPS or other geonavigation system itself may generates errors which are not detected by the wireless communication system; however the geonavigation system is considered to be reliable in the sense of detecting location.

Tracking based on a cellphone or other WCD by use of a geolocation system results in a location only accurate to a few meters at best, and sometimes is only accurate to hundreds of meters. This is a separate issue from the "reliable" nature of the GPS signal. This is often sufficient for location services, but for some items, like keys, a purse or a small pet, it may still be hard to locate the lost object even when directed within a few meters of the object.

Obtaining location data for a WCD beyond that provided by a determination of a localized radio reception area is useful for a number of reasons, such as providing emergency services and providing consumer directional assistance. Emergency services callers dial a police emergency number, whereupon emergency services are dispatched to the caller's location. This is accessed by using an emergency services number or universal emergency telephone number, such as "999" (UK), "911" (North America), "112" (Europe), etc. Many emergency call centers have a feature called "marking of origin". The phone number of the caller is transmitted via the network, and the address corresponding to the phone number is located in the database of the telephone network provider. By using digital maps and mapping applications, the position of the address can be shown on the map instantly as calls arrive.

In the case of landlines, the location of the caller is usually provided by telephone account data or the like, referred to as automatic number identification (ANI) in North American SS 7 systems. Modifications of ANI, called "Enhanced 911" have been implemented in North America, but these services are still based on a fixed subscriber location.

In the case of mobile telephone services, the physical location is not inherent in the connection service. Cellular telephones are generally not located by ANI information such as area code and prefix. Automatic Location Identification (ALI) is intended to provide physical location of cellular telephones, either by network-based identification of location or by WCD based geolocation.

There are instances in which ALI is unable to accurately determine the location of a WCD, most notably when a GPS-enabled WCD is unable to acquire the GPS satellite signals. By way of example, metallization of a building will create a Faraday enclosure for GPS reception. Thus, while "Enhanced 911" mandates partial and full ALI capabilities, the ALI data may not be available. Location services are limited, in part because of the difficulty of receiving sufficient GPS signals with mobile telephones, particularly from within an enclosure.

The data used to perform location can be obtained from the WCD itself, as is the case of GPS, primarily from the network base station, as is typical with Angle of Arrival (AOA), Time of Arrival (TOA) and Time Difference of Arrival (TDOA), or a combination of network determination and device determination. It is possible to enhance the GPS tracking ability by use of signals from a base station. This implements techniques known as assisted GPS (A-GPS). One A-GPS function provides additional information, including satellite constellation data, to the WCD through a communications datalink, to significantly improve the chance for acquiring GPS signals. A second location technique used in association with wireless networks uses triangulation from the base stations, such as Angle of Arrival (AOA), Time of Arrival (TOA) and Time Difference of Arrival (TDOA).

GPS based systems in particular consume significant battery power from a receiver, so it is advantageous to leave the location function turned off during normal operation. In the case of network-based location services, the location services depend on the extent of the WCD's level of communication with the network. In a quiescent state, the WCD may only provide signals sufficient to allow the network to identify a particular transmitter sector to use to communicate with the WCD. Users of WCDs also turn off location services so as to avoid the potential for commercial abuse of the location data. Many WCDs which are GPS enabled are configurable to limit location services to emergency calls, or to only turn on the location service when location-based communication services are desired, such for obtaining directions. In such cases, the location device is activated by activating an emergency call service, or launching of location-based communication application.

Long distance and local location and tracking can be solved separately. Tracking devices either send data back over a communications network which contains the location, or they emit a beacon signal that can be tracked by another device within an appropriate proximity—typically some type of radio receiver. These devices either operate in one mode, or the other and employ two separate tracking functions.

Tracking based on a cellphone or other WCD by use of a geolocation system results in a location only accurate to a few meters at best, and sometimes is only accurate to hundreds of meters. This is a separate issue from the "reliable" nature of the GPS signal. This is often sufficient for location services, but for some items, like keys, a purse or a small pet, it may still be hard to locate the lost object even when directed within a few meters of the object.

Additionally, indoors as described above, an A-GPS geolocation system can result in locations that vary by hundreds of meters. For example, FIG. 1 is a map depicting locations determined by AGPS for a WCD 103 inside a building, shown as "Building L", at a location estimated to be at position 111. The WCD location samples are indicated by the small squares (■), not separately identified. As can be seen, the WCD "wandered" within the building, outside the building, and at times extending toward Building KS at location 125. While it is not clear whether the user was at Building KS, the WCD was left on the desk in the office at location during the whole time 111 and in reality did not follow the user to Building KS 125 or another location. Tracking of the WCD was accomplished by the wireless network; however various factors, mostly related to signal propagation presumably resulted in the variation in detected location. This is indicative of the ambiguity of tracking a WCD inside a building.

FIG. 2 is a map depicting locations determined by AGPS for several WCDs. A significant percentage of the samples are taken inside a building at position 111. Most locations for the building are in the general area of the building, with that area indicated (at 135); however some depict movement (e.g., 243, 244) across the large highway 255, which did not occur. Other indications indicate other local areas (at 125-127). In the case of some adjacent areas such as 266, there's an ambiguity suggesting that the user may have been walking with the device across those areas, but other locations (273, 275, 277) are suggestive of inaccurate results.

These patterns of location have some degree of predictability. The map of FIG. 2 depicts locations determined by AGPS for several WCDs left inside the building at the same location. As can be seen, the patterns represented by the WCDs differ for each WCD. Tracking these WCDs gives the impression that they are wandering, either across the roadways or into neighboring buildings, and in several cases nearly a kilometer away (at 273). It is likely that the WCD would "wander" further (according to the sample location readings), except that the location readings are constrained by the WCD's communication with a sector within the network.

FIGS. 3A and 3B are maps depicting the results of tracking the 5 devices from FIG. 2 while walking outside with the devices. Results near Building L are scattered, although some locations correspond to actual movement of the WCD outside of Building L. Other results are further away, but based on the cultural features of the map, it can be seen that they reflect accurate indications of location. For example, the WCDs were detected along the roadways (at 335-338) or in a retail area (at 341). These readings are representative of readings taken outdoors, which are generally much more accurate than those taken from within a building.

While the maps may be interesting, the ambiguities mean that, for example, location services provided for emergency services are unable to precisely locate the WCD or more significantly a user sending a distress signal. If one is looking for a small object, the information provided by the location service merely indicates that the object is within perhaps half a city block, which is often inadequate for purposes of more precise identification of the location of an object.

Rate instruments have been used to detect location, most notably on aircraft. Rate instruments include inertial reference platforms and similar instruments that measure acceleration, changes in direction, changes in velocity, attitude changes and the like. One example is a set of three-axis gyroscopes and accelerometers used to obtain accurate attitude, direction and position information of a platform in inertial space. Given sufficient data including an original position, it is possible to determine the position of an object based on rate measurements derived from rate instruments, with corrections made for precession and similar errors. For purposes of this invention, "rate" is intended to refer to motion and other positional change, including acceleration, velocity and other changes in velocity.

SUMMARY

A wireless device capable of communication with a multiuser wireless subscriber network provides location data concerning an object. The wireless device includes a wireless communication circuit, a geolocation reading circuit, a local locating device and a control circuit responsive to the geolocation circuit and to the local location data. The geolocation reading circuit obtains geolocation data concerning the object and the local locating device parses local location data. The control circuit responds to the geolocation circuit to provide an indication of geolocation based on the geolocation data, and responds to the local location data to supplement the geolocation data with the local location data.

In a particular configuration the wireless device is capable of modifying the geolocation data with the local location data, or provides a relative reading of the geolocation data concerning the object. The multiuser subscriber network may be used to communicate a request for a transmission of a local signal identifiable with the object.

A wireless device capable of communication with a multiuser wireless subscriber network may be used for providing location data, in which the device includes a local locating device capable and a control circuit. The a local locating device provides local location data. The control circuit responds to a predetermined event to provide the local location data. The local location data enables augmentation of geolocation data provided by the network with the local location data.

The control circuit can respond to an external signal or a sensed condition signal as the predetermined event. In one configuration, the predetermined event is used to activate a geolocation circuit capable of providing geolocation data concerning the object.

The techniques can be used to detect a first event related to location, for example acceleration or a radio signal. In response to detection of the event, geolocation data is provided by activating a GPS or other monitoring of geolocation. The geolocation is used to detect a second event related to location. Data concerning one or both geolocation events is provided, for example, through a multiuser subscriber wireless network.

Location data is obtained from a mobile object by obtaining geolocation data, obtaining an indication of a reliability characteristic of the geolocation data, determining a need for local location data, based in part on the reliability characteristic falling below predetermined criteria. In the case of need for local location data, a request for a local signal is transmitted in the event of lack of presence of such a local beacon signal, and a need for the local location data.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Figure 1:
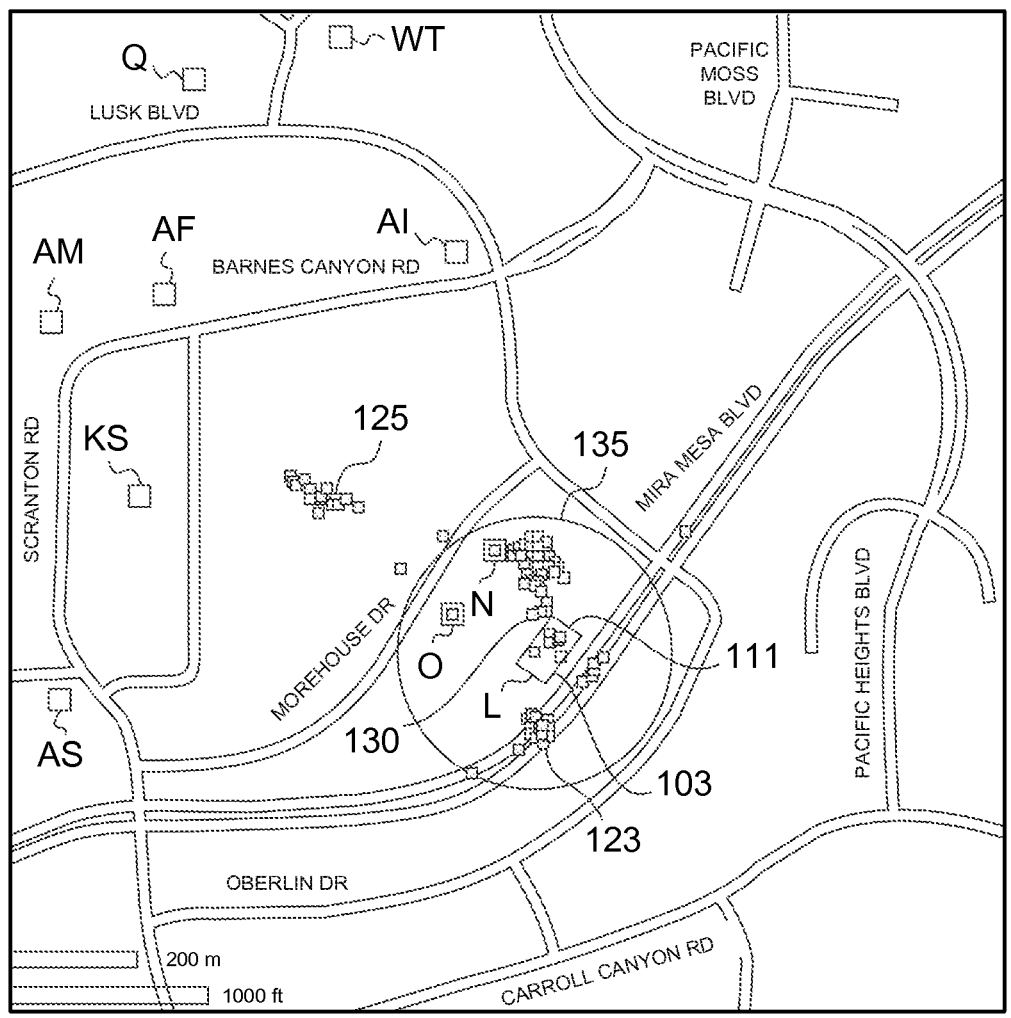
FIG. 1 is a map depicting locations determined by AGPS for a WCD inside a building.
Figure 2:
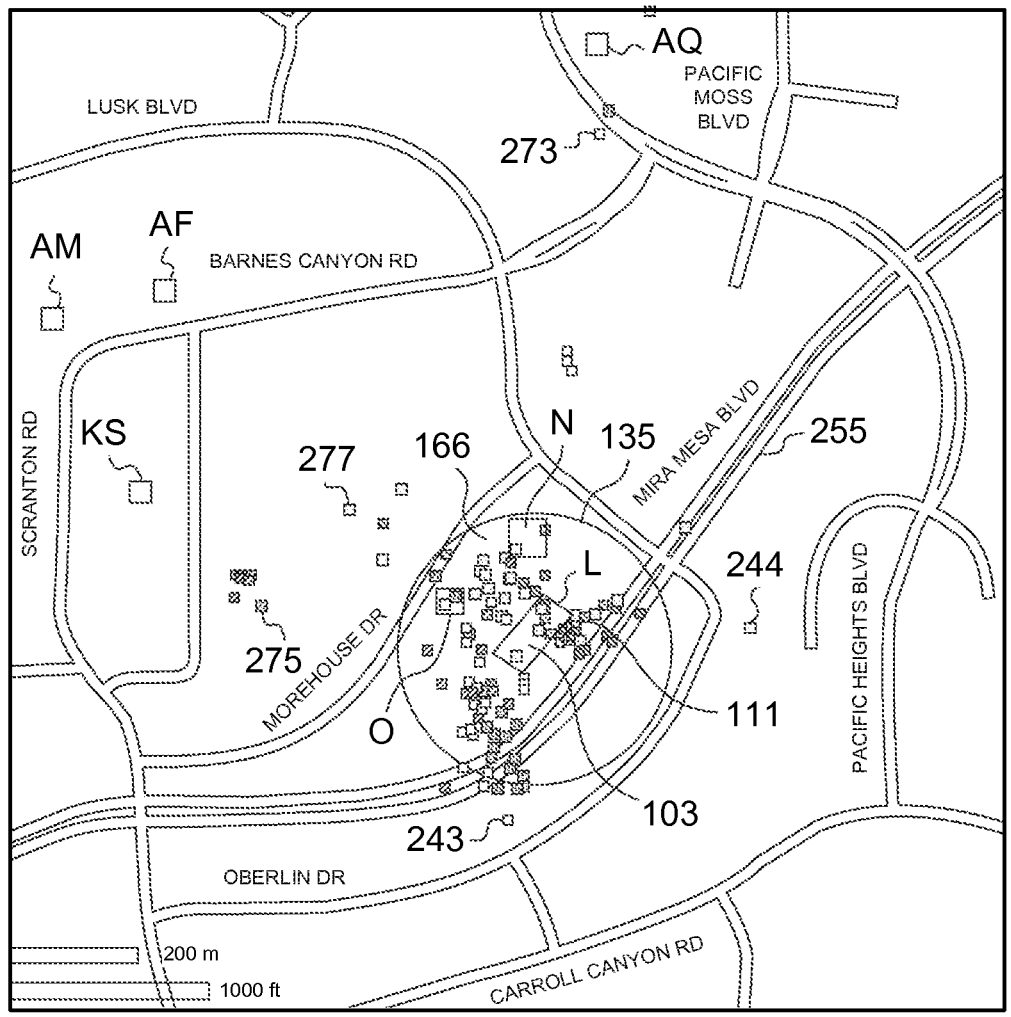
FIG. 2 is a map depicting locations determined by AGPS for several WCDs.
Figure 3A:
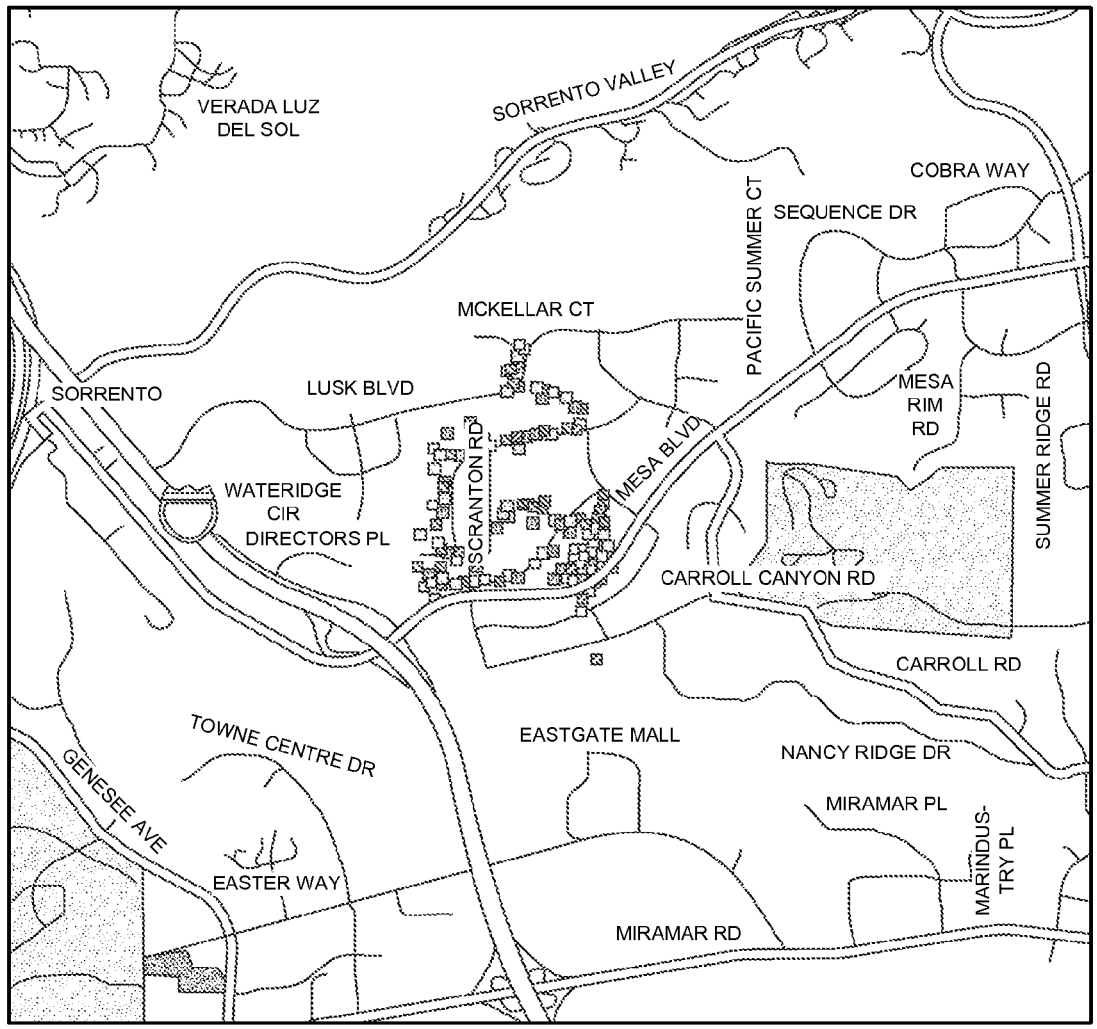
FIGS. 3A and 3B are maps depicting locations determined by AGPS as tracked within a neighborhood area.
Figure 3B:
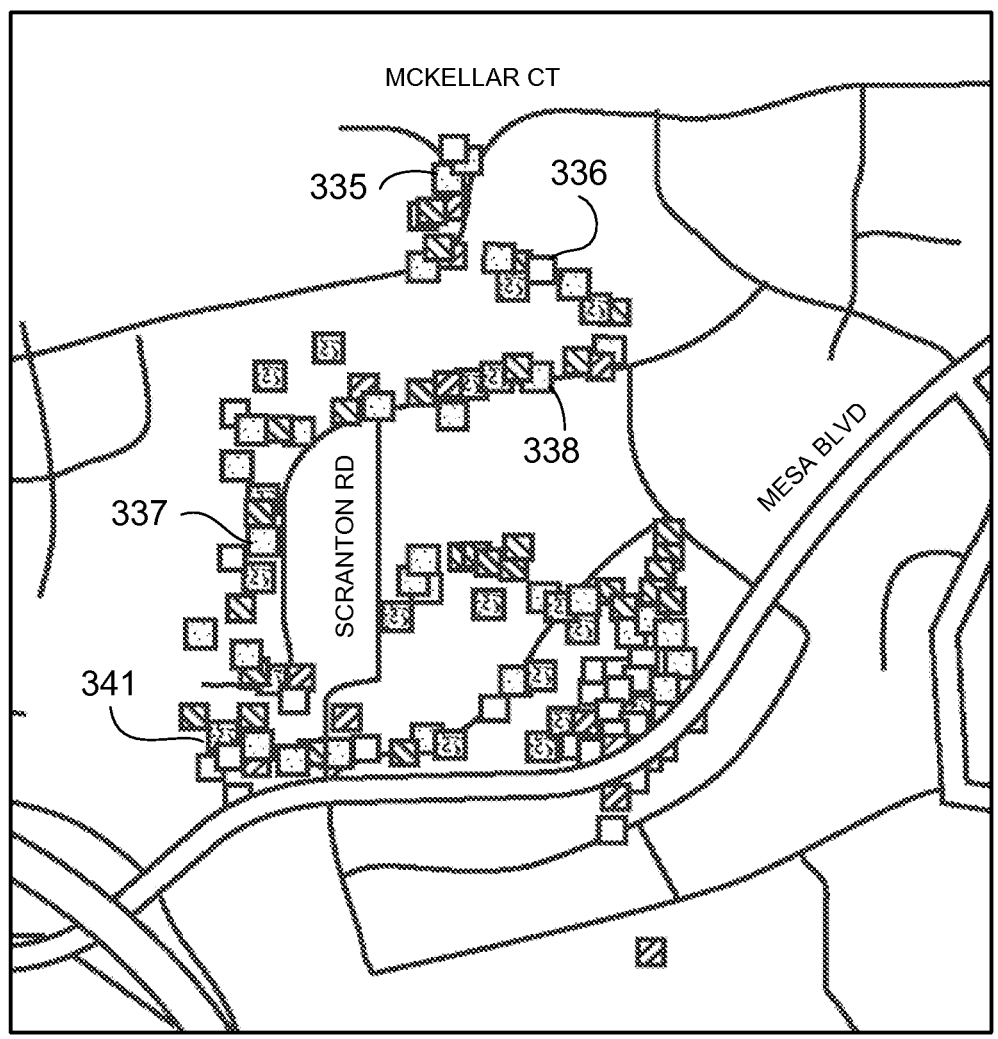

The word "exemplary" is used herein to mean "serving as an example, instance, or illustration." Any embodiment described herein as "exemplary" is not necessarily to be construed as preferred or advantageous over other embodiments. The word "example" is used herein to mean "a non-limiting example." Each example provided herein is an illustration of merely one embodiment; many others may exist, and no provided example should be construed as limiting an otherwise broader category.

Multi-Mode Tracking

When a tracked device is being located a multi-mode tracking operation can be used, a wide area location is determined by use of network location services. Upon arriving at the location identified by wide area location, the tracked device can be reconfigured into local beacon mode and the responder can follow the strength and direction of the signal until arriving at a place where the item is detected or found.

In one configuration, a target WCD to be tracked is identified by a tracking WCD and the network is queried as to the location of the target WCD. If the network has location information for the WCD and the location information is deemed to be current, then that information is transmitted to the tracking WCD. The WCD may be configured so as to respond to a hailing signal from a tracking WCD by enabling the location functions of the WCD and thereby provide location data. The location data is accessed over the network and provided to the tracking WCD as wide area location data.

The wide area location data provided to the tracking WCD has accuracy limitations. The tracked WCD, in response to being queried, emits at least one beacon signal capable of being tracked locally. Therefore, if the wide area location data is sufficient to identify the location of the tracked WCD to an extent necessary to receive the beacon signal, the beacon signal can be used to more precisely locate the tracked WCD.

It is possible to allow the tracked WCD to remain quiescent as far as transmissions are concerned. In this manner, the tracked WCD is presumed to be within a predetermined reception area, either because of signals periodically received by the WCD or because the WCD is presumed unlikely to move beyond the predetermined area. This allows the tracked WCD to remain active for extended periods of time without excessive battery consumption and without transmitting significant amounts of electromagnetic energy. This is presently done with ELT transmitters, which are quiescent until activated, either by acceleration or manually. Similarly, GPS location services are often left inactive except when making an emergency call. The additional location data may also be selectively activated, so that location services and beacon signals are activated only under predetermined conditions.

Since the wide area location data provided to the tracking WCD has accuracy limitations, additional local area data location information can allow the WCD to further augment its location data. The WCD can use a known good reference point from a wide area fix such as GPS when outdoors to establish a reference point. Then, upon going indoors the WCD can use that reference fix, and local location data derived from rate sensing circuits in the WCD to augment the precision of the wide area location data that is available indoors.

Valid Data

Referring again to FIG. 1, at some point WCD 103 was outside building L, and provided reception at that location. In the case of WCD 103 entering Building L at location 130, a last known reliable location signal would have been received; however it is also possible that there is no such reference. In either case, it can be determined that the data points within a small region, marked 135 are more likely to be valid than, for example data points 137. By using the cluster of datapoints within region 135, a weighted average of valid points can be made more reliable than if all data points are accepted. If further data concerning movement of the WCD 103 becomes available, this movement can be matched to a limited region, such as region 135.

Augmentation of Location Data

In addition to assisted GPS (A-GPS), device location is augmented by using further information concerning the WCD. Since the reliability of the GPS or other location data can usually be determined, determination of location can take into account that reliability.

The accuracy of the wide area location data may be provided to the tracking WCD, or the wide area location data may be used to blindly access the general location of the tracked WCD. In either case, the location data is augmented by use of rate sensing. The rate sensing can include any inertial instrument, including an accelerometer, gyroscope or other sensing device. As a result, if the WCD detects rate commensurate with movement within Building L, it is possible to deduce that the WCD is not likely to be a kilometer away.

On the other hand, if the WCD is in a covered parking garage, the WCD may be carried into a vehicle and then can travel far more than a kilometer away. If the WCD is able to detect rate, then it can accept modifications to its detected location which are in accord with the detected rate. To the extent that the rate measurements are reliable, the location can be precisely modified.

In the case of acceleration, the ability to precisely determine velocity may be limited. This can be augmented with external location information, including GPS and information from communication with a radio network. This allows the WCD's velocity to be determined over a period of time, while allowing for measurement of instantaneous changes in velocity. This provides velocity data which can be used to provide location data.

In another configuration, the wide area location data is used to determine a valid location zone for the WCD. In general, the accuracy of the location data can be determined. In the case of GPS geolocation, the receiving device (the WCD) is able to provide an indication of the accuracy of the location information based on its reception. This does not accommodate minor and substantial deviations caused by the geolocation system itself, however the accuracy of such systems is generally a known factor. In the case of wireless network communications, the wireless network also provides an indication of the location of the WCD. The location as determined by the wireless network can be matched to that provided by the geolocation system. In many cases it is possible to determine the validity of the geolocation system based on location data determined by the wireless network.

The ability to match location determined by wireless network signals to geolocation location provides an indication of likely movement of a WCD. For example, if a user enters a closed parking garage, the last known location for the WCD based on satellite navigation (e.g., GPS) would be the location that the user entered the building, or perhaps a location where the user was inside the building but had outside reception. If the WCD is placed inside a vehicle, the WCD may be able to receive satellite navigation signals, or may be blocked from receipt of such signals. In either case, the location determined for the WCD should generally match the location determined by the network in communication with the WCD.

Obtaining an Average of Two Independent Measurements of Geolocation

If two independent methods are used to determine location, the methods can be used additively, as would be the case of determining relative location between two devices, or can be used to establish a non-relative determination or weighted determination. The non-relative determination is used to provide a more accurate determination using network resources or resources within the tracked device itself. Obtaining an average of two independent measurements of geolocation requires calculation, an example of which follows.

Assuming we have two independent method to measure geolocation for an object and also that each method is unbiased, the measurement accuracy of each method can be represented using the standard deviation of the measurement sample. This presumes that the average of many samples using one method is the true location of the object.

In probability, the standard deviation of a probability distribution of value is a measure of the spread of its value. The smaller the standard deviation, the more "concentrated" the values are, the more accurate an individual measurement is statistically. Standard deviation is defined as the square root of the variance. For a random variable X, variance is defined as:

$$\sigma^2 = E((X - E(X))^2) \quad (1)$$

Assuming the first method ("method 1") for measuring X is more accurate with a lower standard deviation therefore lower variance of, the second method ("method 2") has the measurement variance of $$\sigma_2^2 k * \sigma_1^2 \ (k > 1) \quad (2)$$

We then select a weighted average to calculate the location based on readings from both method 1 and method 2:

$$X' = w * X_1 + (1-w) * X_2. \ (0 < w < 1) \quad (3)$$

The goal is to select the "optimal" weight w, which would minimize the standard deviation of $$\begin{aligned}
\sigma'^2 &= E((X' - E(X'))^2) \\
&= E((w * X_1 + (1-w) * X_2) - E(w * X_1 + (1-w) * X_2))^2) \\
&= E((w * (X_1 - E(X_1)) + (1-w) * (X_2 - E(X_2)))^2)
\end{aligned} \quad (4)$$

$$\sigma'^2 = E(((w*(X_1 - E(X_1)))^2 + ((1-w)*(X_2 - E(X_2)))^2 + 2(w* (X_1 - E(X_1))) * (1-w) * (X_2 - E(X_2)))) \quad (5)$$

$$\sigma'^2 = E(((w*(X_1 - E(X_1)))^2) + E((1-w)*(X_2 - E(X_2)))^2) + 2*E(w*(X_1 - E(X_1)))*(1-w)*(X_2 - E(X_2))) \quad (6)$$

Given that method 1 and method 2 are independent, $$E(w*(X_1 - E(X_1))*(1-w)*(X_2 - E(X_2))) = w*(1-w)E((X_1 - E(X_1))*(X_2 - E(X_2))) = 0 \quad (7)$$

$$\sigma'^2 = E(((w*(X_1-E(X_1)))^2) + E((1-w)*(X_2-E(X_2)))^2) \quad (8)$$

$$\sigma'^2 = w^2 * E((X_1-E(X_1))^2) + (1-w)^2 * E((X_2-E(X_2))^2) \quad (9)$$

$$\sigma'^2 = w^2 * \sigma_1^2 + (1-w)^2 * \sigma_2^2 \quad (10)$$

$$\sigma'^2 = w^2 * \sigma_1^2 + (1-w)^2 * k * \sigma_1^2 \quad (11)$$

$$\sigma'^2 = (w^2 + (1-w)^2 * k) * \sigma_1^2 \quad (12)$$

$$\sigma'^2 = (w^2 + (1-2*w+w^2) * k) * \sigma_1^2 \quad (13)$$

$$\sigma'^2 = ((1+k)*w^2 - 2*k*w + k) * \sigma_1^2 \quad (14)$$

$$\sigma'^2 = (1+k) * \left( w^2 - \frac{2*k}{1+k} * w + \frac{k^2}{(1+k)^2} \right) * \sigma_1^2 + \frac{1}{(1+k)} * \sigma_1^2 \quad (15)$$

$$\sigma'^2 = (1+k) * \left( w - \frac{k}{1+k} \right)^2 * \sigma_1^2 + \frac{1}{(1+k)^2} * \sigma_1^2 \quad (16)$$

In order to minimize, we should select the value of w to equal. Thus $$\sigma'^2 = \frac{1}{(1+k)} * \sigma_1^2. \quad (17)$$

This holds true because we assume $$k>1, \sigma'^2 < \sigma_1^2 \quad (18, 19)$$

In another words, by weight averaging the result from two independent measurements, we're able to achieve a more accurate result than the even better measure method can achieve individually. Less variance is achieved, for example, in results which render lower standard deviation.

By use of independent measurements, it is possible to control the standard deviation of samples in order to establish a zone of valid location fixes. If a method used to determine location, such as GPS, loses its location capability, that method is considered to provide measurements of predetermined reliability until the location capability is lost. At that point, an initial zone of valid location fixes can be arbitrarily established. A measurement of change can be use to determine a factor which establishes a change in the zone of valid location fixes. This measurement of change can be rate, acceleration, or another indication relevant to the zone of valid location fixes. Either the measurement of change or a separate independent measurement of location or another measurement can be used as the second independent method to determine location. The zone of valid location fixes can be used to control the standard deviation of the measurements of location.

Further data may also be used to establish the zone of valid location fixes. For example, a WCD in a moving vehicle is likely to communicate through different sectors in a wireless network, whereas the communication sectors in a building are limited. In such cases, location fixes are deemed valid in accordance with the access to network communication.

A weighted average can be implemented to determine location. The weighted average is a way of averaging the end location reading from two totally independent methods. By way of example, a first method would be taking an outdoor GPS reading, and add the position changes over time based on the measurement from rate sensors. Another method would be to use network based positioning, such as triangulation, which would provide the location info of the same end position.

Both methods have their own measurement errors, and can be used independently. Based on the type of technology, the measurement error can be quantified statistically. Using a weighted averaging method, it is possible to achieve a result that is statistically better than another technique. By carefully choosing the weights, for as exemplified by equations (1)-(19), it is possible to provide an improvement in accuracy in determination of location.

Multiple Modes of Tracking Operation

The network location services may include location signals provided from the tracked device's GPS-enabled tracking and reporting ability over the cellular network. This system combines the current method with a local beacon method to ease finding an item when you are already within a few feet of it. This mode could also be used to find an item or person indoors where GPS fixes have poor accuracy, such as finding a person who has called an emergency number (911, 999, 102), or an emergency responder who is trapped (e.g. firefighter).

The multi-mode operation would combine long distance tracking, such as by providing GPS location reports over the cellular network with a local tracking mode where the device emits a beacon, which may also be audible, detectable within a few feet or more. A handheld device can receive and thereby guide a person to find the tracked device by the position reports and by ADF techniques based on the strength and direction of the signal. The local or remote mode of the device can be switched on command or in response to a predetermined event. The device is also able to operate in both modes simultaneously. The local tracking mode could include adjustable signal strength and frequency to aid tracking in different environments. The device used to receive tracking information could also be combined and have two modes as well.

This tracked device may also incorporate techniques such as LDC technology described previously, to conserve battery power. This allows the device to combine different power cycle modes with different circumstances of operation, or respond to location events by changing the cycle mode.

Trackable Device Configuration

Figure 4:
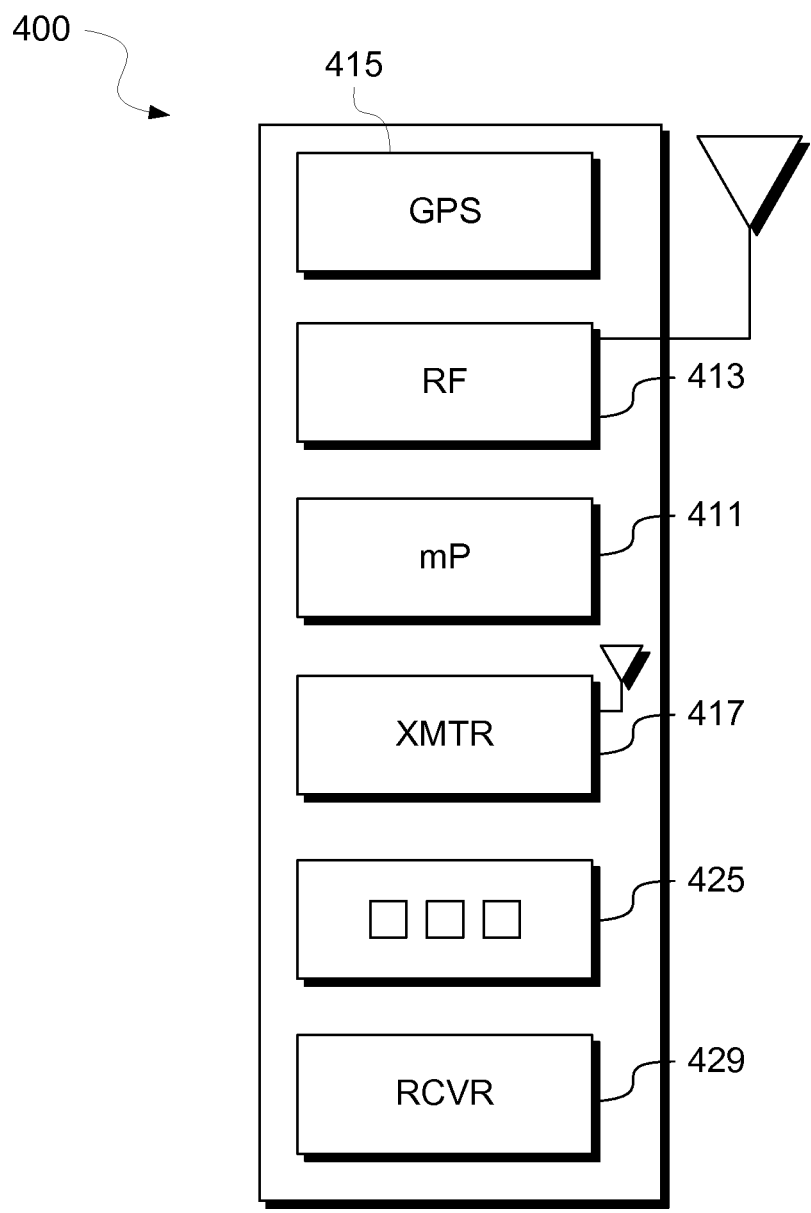
FIG. 4 shows a WCD adapted to provide supplemental data for location services.

FIG. 4 shows a WCD 400 adapted to provide supplemental data for location services. WCD 400 can be used in any circumstance where tracking is deemed desirable, such as for emergency personnel, people who must be tracked, pets and inanimate objects. The WCD includes a processor 411, an air interface 413 used for wireless communication, a geolocation circuit such as a GPS 415 and a homing beacon circuit 417. Additional circuits may include an event sensor 425, and an auxiliary signal detection device 429.

The event sensor 425 may be a rate instrument such a motion detector, accelerometer, gyroscopic rate sensor, a compass device or a combination of these. This enables the WCD 400 to "know" if it has moved and, given sufficient data from the event sensor 425 how far and in which direction. The auxiliary signal detection device 429 also is able to detect events, triggered by a signal. The signal may be present at a doorway or the like, or may be emitted by an external tracking device. The local and/or remote tracking modes are enabled by the event sensor 425, auxiliary signal detection device 429 or by indication relevant to the zone of valid location fixes or geo-fencing.

In the case of a WCD 400 used by a pet, the event sensor 425 and auxiliary signal detection devices are able to detect movement of the pet. This can be used to signal the movement of the pet to an outdoor area, or to allow the pet's WCD to respond to a tracking device. The WCD 400 is able to transmit location data according to a predetermined set of criteria. By limiting the criteria under which the WCD 400 transmits location data, battery power is conserved. If the WCD 400 is to provide location data but only under predetermined conditions, the WCD 400 must be able to respond to events; otherwise the WCD would have to remain in an active communication mode and provide location determinations. These location determinations and transmissions are costly in terms of battery usage, and therefore the event sensor 425 is used to allow the WCD to remain in a quiescent mode prior to the predetermined event.

The homing beacon circuit 417 can be activated either upon an internal event sensed by the event sensor 425, such as acceleration, or in response to an external request for a homing signal. The external request of course must be received, so the event sensor 425 must at least be able to switch the WCD 400 to a receive mode.

If the WCD is provided for monitoring a pet, the WCD 400 can provide location data when the pet has moved to a predetermined safe area outdoors. If the pet moves beyond the safe area, the data is sufficient to indicate the location, and the pet's caretaker can be notified. This can be accomplished by the pet's WCD sending a signal through the wireless network to the caretaker, or by the caretaker receiving tracking signals provided through the wireless network indicating the location of the pet's WCD 400. It is not necessary to provide such monitoring of the pet when the pet is in a secure area, and so the activation of the WCD is limited to particular events. This reduces battery usage because the event sensor 425 is used to allow the WCD to remain in a quiescent mode prior to the predetermined event. On the other hand, it is possible to provide a reception mode for the WCD 400 so that the WCD 400 can respond to a tracking request without first sensing an event other than the tracking request.

The ability to detect location events permits multiple modes of monitoring the WCD 400. A first level of monitoring is associated with a first status the WCD 400, which can be completely quiescent with no data provided. The first level of monitoring can be no monitoring at all other than awaiting detection of a location event. A second level of monitoring is initiated by detection of a first event related to location. A third level of detection is associated with detection of a second event related to location. An alert signal may be provided upon detection of at least one location event.

If, for example, the WCD 400 is used to monitor a pet or child, the first level of monitoring can be a predetermined safe area, such as inside a house. The second level of monitoring may be, for example, a designated exercise area or fenced area. The pet is in this case being monitored by the WCD 400 and the user is provided with an indication of either the pet's location or the status of the pet in the designated area. An alert can be provided in response to the detection of the first event to inform the caretaker that the pet has moved outside. The third level of detection results in the caretaker being alerted and provided with location information. Thus, instead of actively watching the pet, the caretaker is provided with information regarding the pet's whereabouts, and is informed should the pet leave the designated area.

Tracking Device Configuration

Figure 5:
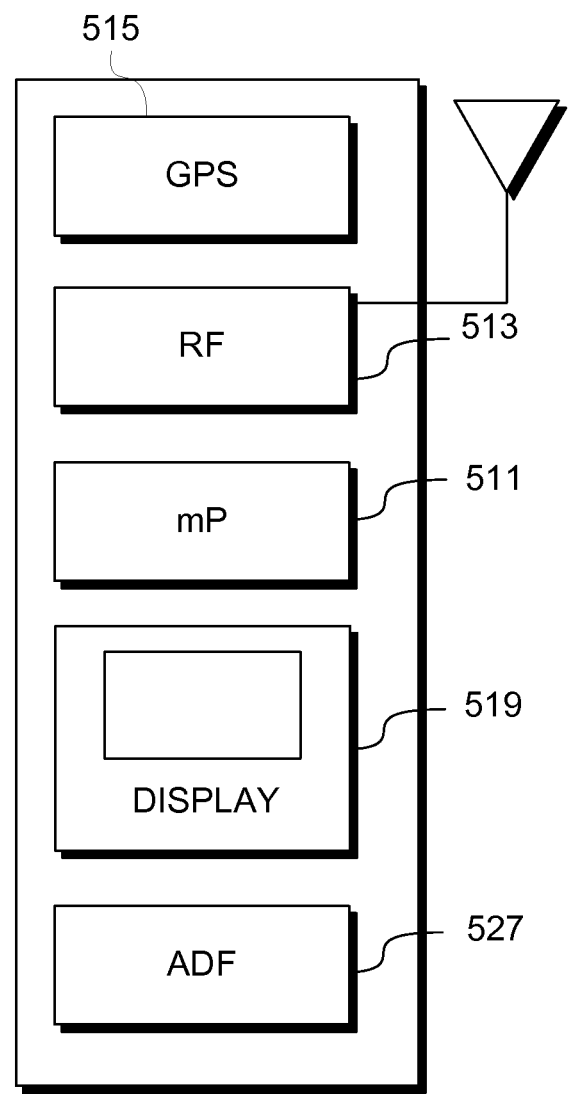
FIG. 5 is a schematic block diagram of a tracking WCD adapted to track an object.

FIG. 5 is a schematic block diagram of a tracking WCD 500 adapted to track an object, such as WCD 400. Tracking WCD 500 includes a processor 511, an air interface 513 used for wireless communication, a geolocation circuit such as a GPS 515 and a display 519. Tracking WCD 500 also includes a radio direction finder (ADF) 527 capable of determining a relative location of a homing beacon such as homing beacon from the homing circuit 417 associated with WCD 400. The tracking WCD 500 is able to receive an indication of the location of a target WCD, such as WCD 400, depending of course on the availability of this data, and display a location of that target WCD relative to its own location, meaning the location of tracking WCD 500. The tracking WCD can issue a homing beacon request, which the target WCD 400 responds to and transmits a homing beacon, enabling the radio direction finder 527 to locate the target WCD 400. While the received location of target WCD 400 and the location of tracking WCD 500 are dependent on location services such as GPS and location determination by a radio network, the radio direction finder 527 is able to provide at least relative direction based on signal propagation nulls and signal strength. In general, the combination of data from location services and the radio direction is sufficient to locate the object.

Operation

Figure 6:
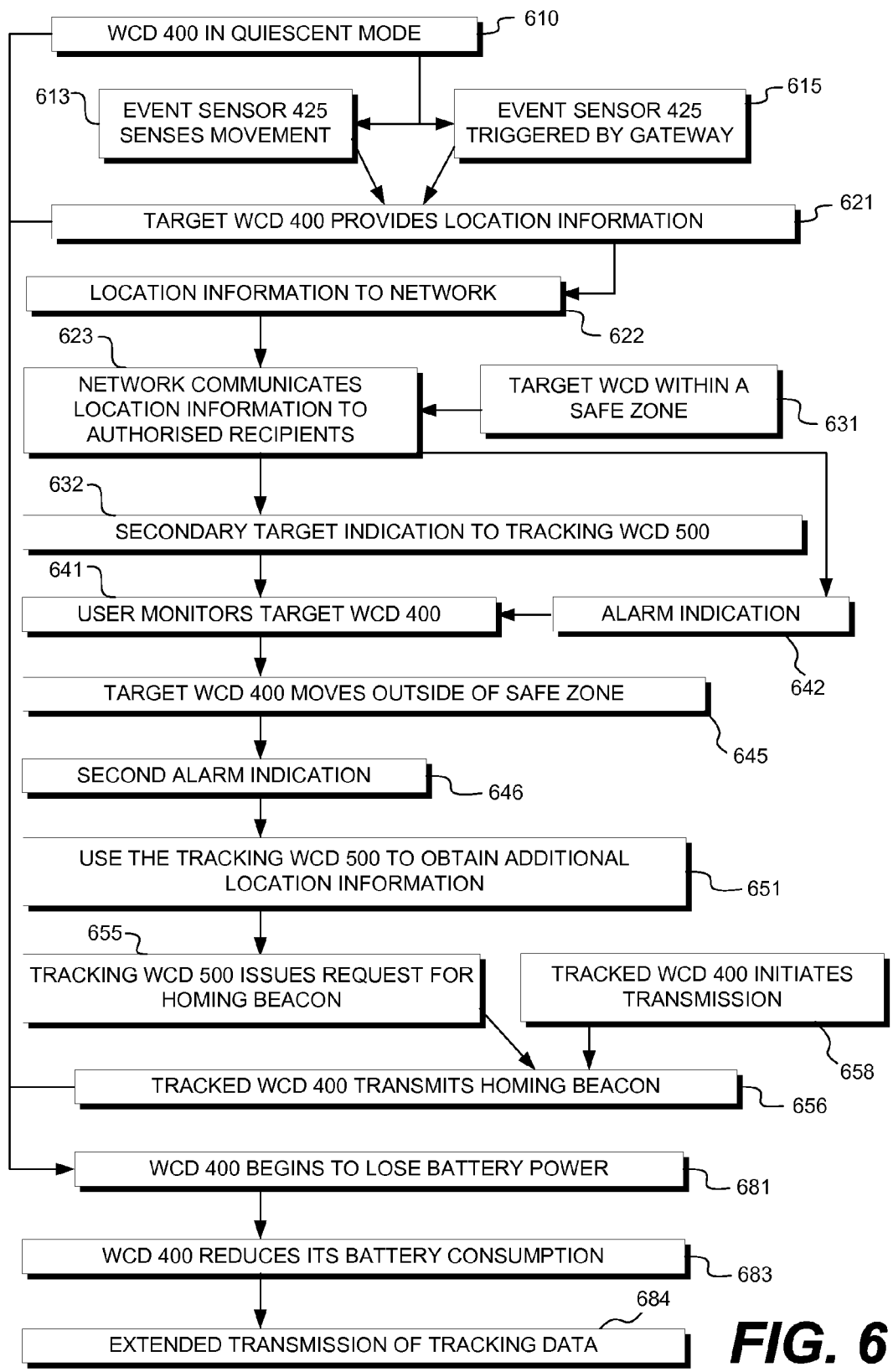
FIG. 6 is a flow chart showing operation of A target WCD and tracking WCD.

FIG. 6 is a flow chart showing operation of the target WCD 400 and tracking WCD 500. The target WCD 400 is normally in a quiescent mode (step 610), during which the tracked WCD is providing little or no communication. If the event sensor 425 senses movement (step 613) or is triggered by passing an electronic gateway (step 615), the target WCD 400 begins to provide location information (step 621). This location information is transmitted to a wireless network (step 622), which is in turn communicated to authorized recipients (step 623). The authorized recipients may be other WCDs such as tracking WCD 500, but may also include other recipients, such as users with computers connected to the network. In the example, the initial event places the target WCD within a designated zone considered safe (status 631), such as a dog in a designated outdoor area. The recipient is provided with the location of the target WCD as a secondary target indication (step 632). The indication is considered a "secondary target indication" or "secondary return" because the indication of the detected location is based in part on secondary data provided by the target, such as an identification code of the target, rather than direct detection of the target.

The secondary target indication enables a user with a tracking WCD 500 or other monitor to monitor (step 641) the target WCD 400. This enables the user to provide a certain level of monitoring of the target; however at this stage, the status of the target is that the target WCD 400 is in the designated zone. An alarm indication can be provided (step 642), indicating that the target is in an actively monitored area (the designated zone). If the target WCD 400 moves outside of the designated zone (step 645), a second alarm indication is provided (step 646), indicating that the target WCD 400 has left the designated zone. At that point, the user can take whatever action is necessary. This could range from increased observation to remedial activity. In the case of the object not being observed, the user may use the tracking WCD 500 to obtain additional location information (step 651). The tracking WCD 500 provides the above-mentioned relative location based on received location data. If necessary the tracking WCD 500 can issue a request (step 655) for the target WCD 400 to transmit a homing beacon (step 656) to aid in location by the tracking WCD 500. Since the status of the tracked WCD 400 outside of the safe area is probably known, the tracked target WCD 400 can initiate the transmission of the homing beacon (step 658) without waiting for a request from the tracking WCD 500. The response (step 656) by the target WCD 400 to a request (step 655) for transmitting a homing beacon is also advantageous in instances where the target object is inherently difficult to locate even in a safe area.

At some point, the tracked WCD 400 will begin to lose battery power (step 681). The tracked WCD 400 can be programmed to reduce its battery consumption (step 683) consistent with LDC criteria. This allows extended transmission of tracking data (step 684), although at a diminished level.

Referring back to FIG. 4, if the event sensor 425 is able to detect motion or changes in motion, WCD 400 is also able to provide an indication of movement past a point of diminished availability of location services. For example, if the WCD's 400 detects that its location data is unreliable, an accelerometer can detect changes in speed. This provides an indication of location of the WCD 400 based on the last known location and detected movement from that last known location. The accuracy of the revised information is of course improved with an increased sophistication of rate sensing by the event sensor 425. The event sensor 425 may be a rate instrument such a motion detector, accelerometer, gyroscopic rate sensor, a compass device or a combination of these.

Functional Configuration

Figure 7:
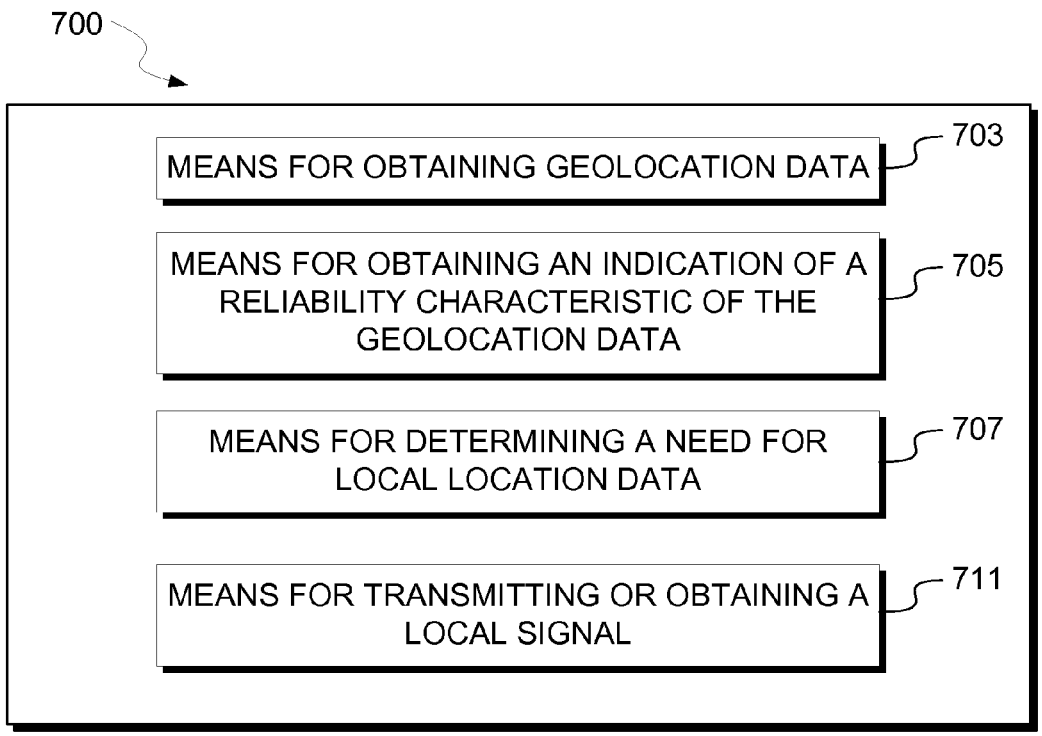
FIG. 7 is a diagram showing the functional configuration of apparatus for providing an indication of location data.

FIG. 7 is a diagram showing the functional configuration of apparatus 700 for providing an indication of location data. The apparatus 700 includes means 703 for obtaining geolocation data, which may be a GPS, a circuit for receiving GPS data from an external device or a combination of the two. Means 705 for obtaining an indication of a reliability characteristic of the geolocation data are provided, which may be a processing circuit or a receiver for receiving reliability indications from a network connection. In the case of a GPS used to provide geolocation data, the GPS is able to provide an indication of reliability of the signal based on satellite acquisition, signal strength and concordance of data received from multiple satellite signals. This reliability data may be internal, as in the case of the apparatus 700 being tracked, or external, as in the case of a tracking device, or a combination of internal and external. Means 707 for determining a need for local location data are included, which can range from manual input to a program responsive to conditions. The means 707 for determining the need may also be a receiver responsive to a request for local location data or a transmitter transmitting such a request. The apparatus 700 includes means 711 for transmitting or obtaining a local signal, which may be a local beacon transmitting or receiving circuit. The local signal is one way of providing augmentation data for locating the mobile object.

In one configuration, the apparatus 700 provides the user of the apparatus with a capability of determining the location when separated from the mobile object, and is therefore the tracked device. In an alternate configuration, the apparatus 700 provides the location data of the mobile object provides an external device with data sufficient for determining the location of the object with the external device separated from the mobile object. This would be the tracking device.

Figure 8:
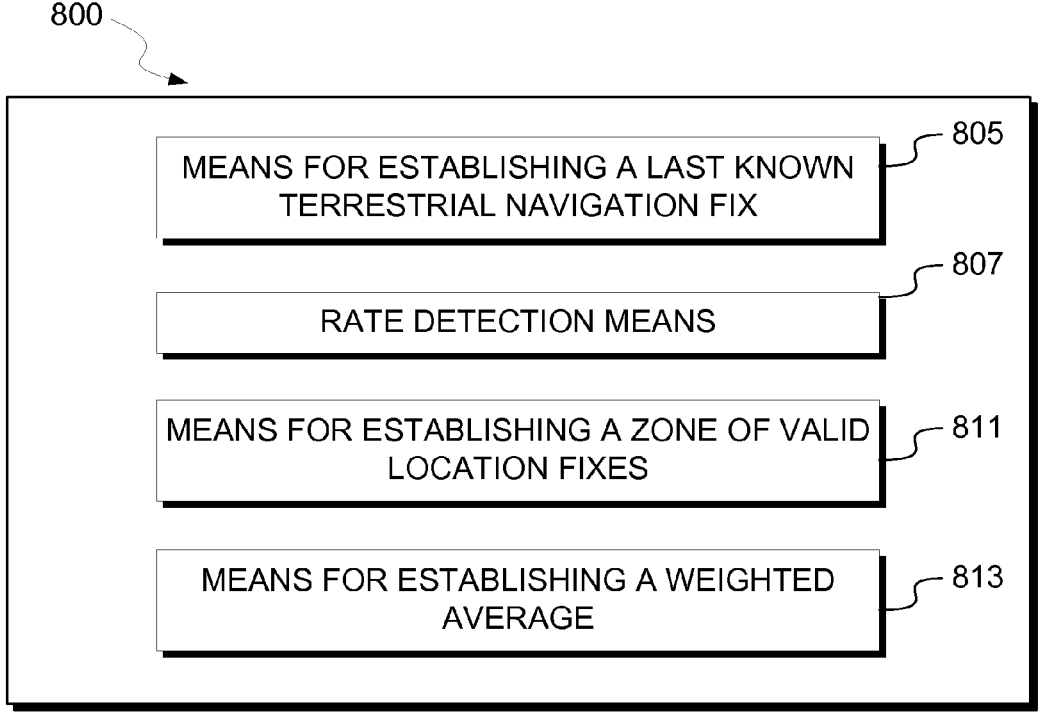
FIG. 8 is a diagram showing the functional configuration of apparatus for providing information regarding the location of a WCD.

FIG. 8 is a diagram showing the functional configuration of apparatus 800 for providing information regarding the location of a WCD. The apparatus includes, means 805 for establishing a last known terrestrial navigation fix, rate detection means 807, means 811 for establishing a zone of valid location fixes, and means 813 for establishing a weighted average of detected location fixes.

The means 805 for establishing a last known terrestrial navigation fix can be a GPS device or a receiver output circuit capable of receiving external GPS readings from a wireless network. The rate detection means 807 can either be internal, as is the case of an inertial reference platform, or a circuit capable of receiving inertial reference data through the network. The means 811 for establishing a zone of valid location fixes uses the reliable terrestrial navigation data to obtain a valid location fix based on the last known terrestrial navigation fix obtained from the means 805 for establishing the last known terrestrial navigation fix, and an output of the rate detection means 807 to obtain location fixes to modify the output of the reliable terrestrial navigation data. The means 813 for establishing a weighted average of detected location fixes uses fixes falling within the zone of valid location fixes. This can include establishing the known terrestrial navigation fix as an initial location, establishing a zone of valid location fixes based on an output of the rate detection means 807, as a modifier of the initial location; and means for providing the weighted average based on received location data and the zone of valid location fixes.

It is also advantageous to eliminate outliers which extend beyond anticipated results. This provides several advantages, including elimination of samples which include significant factors which distort the measurement, elimination of clearly erroneous samples, and allowing a computation based on a series of results which are likely to more closely represent the actual location.

CONCLUSION

The previous description of some embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Further, one or more of the embodiments can be implemented by hardware, software, firmware, middleware, microcode, or any combination thereof. Thus, the present invention is not intended to be limited to the embodiments shown herein but is to be accorded the widest scope consistent with the principles and novel features disclosed herein.

Having described the invention in detail and by reference to the embodiments thereof, it will be apparent that modifications and variations are possible, including the addition of elements or the rearrangement or combination or one or more elements, without departing from the scope of the invention which is defined in the appended claims.

The techniques and modules described herein may be implemented by various means. For example, these techniques may be implemented in hardware, software, or a combination thereof. For a hardware implementation, the processing units within an access point or an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors or demodulators. The memory unit may be implemented within the processor or external to the processor, in which case it can be communicatively coupled to the processor via various means.

The previous description of the disclosed embodiments is provided to enable any person skilled in the art to make or use the features, functions, operations, and embodiments disclosed herein. Various modifications to these embodiments may be readily apparent to those skilled in the art, and the generic principles defined herein may be applied to other embodiments without departing from their spirit or scope. Thus, the present disclosure is not intended to be limited to the embodiments shown herein but is to be accorded the widest scope consistent with the principles and novel features disclosed herein.

What is claimed is:

1. A wireless device for providing location data concerning an object, the wireless device comprising:
   a wireless communication circuit capable of communication with a multiuser wireless subscriber network;
   a geolocation reading circuit capable of obtaining geolocation data concerning the object;
   a local locating device capable of producing local location data; and
   a control circuit responsive to a first event related to location to begin monitoring the geolocation data and responsive to detection of a second event related to location providing an indication of geolocation based on the geolocation data, and further responsive to the local location data to supplement the geolocation data with the local location data.

2. The wireless device of claim 1, further comprising a circuit responsive to the geolocation reading circuit and the local locating device, capable of modifying the geolocation data with the local location data.

3. The wireless device of claim 1, further comprising a geolocation circuit capable of providing a relative reading of the geolocation data concerning the object.

4. The wireless device of claim 1, further comprising a circuit capable of communicating through the multiuser wireless subscriber network a request for a transmission of a local signal identifiable with the object.

5. A method of providing location data concerning an object, the method comprising:
   communicating with a multiuser wireless subscriber network;
   obtaining geolocation data concerning the object;
   producing local location data; and
   responsive to a first event related to location to begin monitoring the geolocation data and responsive to detection of a second event related to location providing an indication of geolocation based on the geolocation data, and further responsive to the local location data, supplementing the geolocation data with the local location data.

6. A non-transitory machine readable medium comprising instructions for performing a method of providing location data concerning an object, the instructions comprising:
   instructions to communicate with a multiuser wireless subscriber network;
   instructions to obtain geolocation data concerning the object;
   instructions to produce local location data; and
   instructions responsive to a first event related to location to begin monitoring the geolocation data and responsive to detection of a second event related to location to provide an indication of geolocation based on the geolocation data, and further responsive to the local location data, to supplement the geolocation data with the local location data.

7. A wireless device for providing location data concerning an object, the wireless device comprising:
   a wireless communication circuit capable of communication with a multiuser wireless subscriber network;
   a local locating device capable of providing local location data concerning the object; and
   a control circuit augmenting geolocation data provided by the network with the local location data to produce location data, the control circuit responsive to a predetermined event related to location, to provide the location data.

8. The wireless device of claim 7, further comprising a geolocation circuit capable of providing geolocation data.

9. The wireless device of claim 7, wherein the control circuit further responds to an external signal to provide the local location data.

10. The wireless device of claim 7, wherein the control circuit further responds to a sensed condition signal to provide the local location data.

11. The wireless device of claim 7, further comprising a geolocation circuit capable of providing geolocation data concerning the object, wherein the predetermined event related to location is determined from the geolocation data.

12. The wireless device of claim 7, further comprising a rate detection device, whereby detected rate activates receiving the geolocation data provided by the network.

13. The wireless device of claim 8, further comprising:
   an acceleration detection device; and
   the control circuit, responsive to acceleration detected by the acceleration detection device to activate the geolocation circuit and the wireless communication circuit to provide geolocation data to the multiuser wireless subscriber network.

14. The wireless device of claim 10, further comprising an event response circuit responsive to a predetermined condition to provide an indication of the sensed condition signal.

15. A method of providing location data using a wireless device, the method comprising:
   detecting at least a first event related to location;
   providing, in response to detection of the first event, geolocation data by activating monitoring of geolocation of the wireless device;
   using the geolocation data to detect a second event related to location; and
   in the case of detection of the second event related to location, providing the geolocation data concerning the wireless device and selectively activating data augmentation in response to at least one of the detected events.

16. The method of claim 15, comprising providing an audible or visible signal to a user concerning the detected geolocation of the wireless device in order to monitor the geolocation.

17. The method of claim 15, comprising providing an output signal through a wireless communication network to permit an external indication of the geolocation of the wireless device.

18. The method of claim 15, further comprising providing an alert signal upon detection of at least one location event, thereby providing a first level of monitoring associated with a first status of the wireless device, a second level of monitoring associated with the first event related to location and a third level of detection associated with detection of the second event related to location.

19. A processor comprising circuitry for providing location data using a wireless device the processor being configured to:
   detect at least a first event related to location;
   provide, in response to detection of the first event, geolocation data by activating monitoring of geolocation of the wireless device;

use the geolocation data to detect a second event related to location; and in the case of detection of the second event related to location, provide the geolocation data concerning the wireless device and selectively activate data augmentation in response to at least one of the detected events.

20. A non-transitory machine readable medium comprising instructions for performing a method of providing location data using a wireless device, the instructions comprising:

instructions to detect at least a first event related to location;

instructions to provide, in response to detection of the first event, geolocation data by activating monitoring of geolocation of the wireless device;

instructions to use the geolocation data to detect a second event related to location; and instructions in the case of detection of the second event related to location, to provide the geolocation data concerning the wireless device and selectively activate data augmentation in response to at least one of the detected events.

21. The method of claim 5, further comprising responsive to the geolocation data and the local location data, modifying the geolocation data with the local location data.

22. The method of claim 5, further comprising providing a relative reading of the geolocation data concerning the object.

23. The method of claim 5, further comprising communicating through the multiuser wireless subscriber network a request for a transmission of a local signal identifiable with the object.

24. A processor comprising circuitry for providing location data concerning an object the processor configured to:

communicate with a multiuser wireless subscriber network;

obtain geolocation data concerning the object;

produce local location data; and responsive to a first event related to location to begin monitoring the geolocation data and responsive to detection of a second event related to location to provide an indication of geolocation based on the geolocation data, and further responsive to the local location data, to supplement the geolocation data with the local location data.

25. An apparatus for providing location data concerning an object, the apparatus comprising:

means for communicating with a multiuser wireless subscriber network;

means for obtaining geolocation data concerning the object;

means for producing local location data; and means responsive to a first event related to location to begin monitoring the geolocation data and responsive to detection of a second event related to location, for providing an indication of geolocation based on the geolocation data, and further responsive to the local location data, for supplementing the geolocation data with the local location data.

26. A method of providing location data concerning an object, the method comprising:

communicating with a multiuser wireless subscriber network;

providing local location data concerning the object; and responsive to a predetermined event related to location, providing the local location data and augmenting geolocation data provided by the network with the local location data.

27. The method of claim 26, further comprising providing geolocation data by a geolocation circuit.

28. The method of claim 26, further comprising responding to an external signal to provide the local location data.

29. The method of claim 26, further comprising responding to a sensed condition signal to provide the local location data.

30. The method claim 26, further comprising providing geolocation data concerning the object, wherein the predetermined event related to location is determined from the geolocation data.

31. The method of claim 26, further comprising responsive to a predetermined condition, providing an indication of the predetermined event.

32. An apparatus for providing location data concerning an object, the apparatus comprising:

means for communicating with a multiuser wireless subscriber network;

means for providing local location data concerning the object; and means for responsive to a predetermined event related to location, providing the local location data and augmenting geolocation data provided by the network with the local location data.

33. A non-transitory machine readable medium comprising instructions for providing location data concerning an object, the instructions comprising:

instructions to communicate with a multiuser wireless subscriber network;

provide local location data concerning the object; and responsive to a predetermined event related to location, to provide the local location data and to augment geolocation data provided by the network with the local location data.

34. A non-transitory computer-readable medium including program code stored thereon, comprising:

program code to communicate with a multiuser wireless subscriber network;

program code to obtain geolocation data concerning an object;

program to produce local location data concerning the object; and program code to provide an indication of geolocation based on the geolocation data in response to a first event related to location to begin monitoring the geolocation data and in response to detection of a second event related to location providing an indication of geolocation based on the geolocation data, and to supplement the geolocation data with the local location data in response to the local location data.

35. A non-transitory computer-readable medium including program code stored thereon, comprising:

program code to detect at least a first event related to location;

program code to provide, in response to detection of the first event, geolocation data by activating monitoring of geolocation of a wireless device;

program code to use the geolocation data to detect a second event related to location; and program code to provide the geolocation data concerning the wireless device in the case of detection of the second event related to location and selective activate data augmentation in response to at least one of the detected events.

36. A non-transitory computer-readable medium including program code stored thereon, comprising:

program code to communicate with a multiuser wireless subscriber network;

program code to provide local location data concerning an object; and program code to provide the local location data and to augment geolocation data provided by the network with the local location data in response to a predetermined event related to location.

37. A wireless device for providing location data concerning an object, the wireless device comprising:
- a wireless communication circuit capable of communication with a multiuser wireless subscriber network;
- a geolocation reading circuit capable of obtaining geolocation data concerning the object; and
- a control circuit responsive to a first event related to location to provide geolocation data by activating monitoring of geolocation of the wireless device with the geolocation reading circuit, to use the geolocation data to detect a second event related to location, and to provide the geolocation data concerning the wireless device in the case of detection of the second event related to location and selective activate data augmentation in response to at least one of the detected events.

* * * * *